US011411925B2

(12) United States Patent
Kumar et al.

(10) Patent No.: US 11,411,925 B2
(45) Date of Patent: Aug. 9, 2022

(54) METHODS, SYSTEMS, AND COMPUTER READABLE MEDIA FOR IMPLEMENTING INDIRECT GENERAL PACKET RADIO SERVICE (GPRS) TUNNELING PROTOCOL (GTP) FIREWALL FILTERING USING DIAMETER AGENT AND SIGNAL TRANSFER POINT (STP)

(71) Applicant: Oracle International Corporation, Redwood Shores, CA (US)

(72) Inventors: Vipin Kumar, Bangalore (IN); Shashikiran Bhalachandra Mahalank, Bangalore (IN); Raghavendra Gopala Rao, Fountain Valley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 365 days.

(21) Appl. No.: 16/732,098

(22) Filed: Dec. 31, 2019

(65) Prior Publication Data
US 2021/0203636 A1    Jul. 1, 2021

(51) Int. Cl.
*H04W 28/02*    (2009.01)
*H04W 24/02*    (2009.01)
(Continued)

(52) U.S. Cl.
CPC .............. *H04L 63/029* (2013.01); *H04W 8/04* (2013.01); *H04W 8/12* (2013.01); *H04W 12/086* (2021.01);
(Continued)

(58) Field of Classification Search
CPC .. H04L 63/029; H04W 76/12; H04W 12/088; H04W 12/086; H04W 8/04; H04W 8/12; H04W 64/003; H04W 80/04; H04W 88/16
(Continued)

(56) References Cited

U.S. PATENT DOCUMENTS 6,091,958 A    7/2000    Bergkvist et al.
6,151,503 A    11/2000    Chavez
(Continued)

FOREIGN PATENT DOCUMENTS

CN    101277541 A    10/2008
CN    10135561 A    1/2009
(Continued)

OTHER PUBLICATIONS

Communication of European publication number and information on the application of Article 67(3) EPC for European Patent Application Serial No. 19730571.7 (dated Apr. 8, 2021).
(Continued)

*Primary Examiner* — Haresh N Patel
(74) *Attorney, Agent, or Firm* — Jenkins, Wilson, Taylor & Hunt, P.A.

(57) ABSTRACT

A method for implementing indirect GTP firewall filtering includes using a signaling message routing node to dynamically populate an indirect GTP-C firewall filtering database with IMSIs and VPLMN IDs extracted from mobility management signaling messages for updating the locations of outbound roaming subscribers. The method further includes receiving a CCR-I message generated in response to a GTP-C message. The method further includes extracting an IMSI and a VPLMN ID from the CCR-I message. The method further includes accessing the indirect GTP-C firewall filtering database using the IMSI extracted from the
(Continued)

CCR-I message. The method further includes determining that a record corresponding to the IMSI is present in the indirect GTP-C firewall filtering database. The method further includes determining that a VPLMN ID in the record does not match the VPLMN ID extracted from the CCR-I message. The method further includes, in response to determining that the VPLMN ID in the record does not match the VPLMN ID extracted from the CCR-I message, rejecting the CCR-I message.

20 Claims, 7 Drawing Sheets

(51) Int. Cl.
*H04L 9/40* (2022.01)
*H04W 76/12* (2018.01)
*H04W 12/088* (2021.01)
*H04W 12/086* (2021.01)
*H04W 8/04* (2009.01)
*H04W 8/12* (2009.01)
*H04W 64/00* (2009.01)
*H04W 80/04* (2009.01)
*H04W 88/16* (2009.01)

(52) U.S. Cl.
CPC ....... *H04W 12/088* (2021.01); *H04W 64/003* (2013.01); *H04W 76/12* (2018.02); *H04W 80/04* (2013.01); *H04W 88/16* (2013.01)

(58) Field of Classification Search
USPC .......................................................... 726/11
See application file for complete search history.

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,107,094 B2* | 8/2015 | Rubin ................ H04L 63/0861 |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,912,486 B1 | 3/2018 | Sharifi Mehr |
| 10,009,751 B2* | 6/2018 | Gundavelli ............ H04W 8/04 |
| 10,021,738 B1 | 7/2018 | Mehta et al. |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2* | 4/2020 | Kumar .................... G06F 16/22 |
| 10,652,850 B2 | 5/2020 | Landais et al. |
| 10,834,045 B2 | 11/2020 | Mahalank et al. |
| 10,931,668 B2 | 2/2021 | Mehta |
| 10,952,063 B2 | 3/2021 | Mehta |
| 10,984,128 B1* | 4/2021 | Hoffer .................... G16B 50/00 |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0281718 A1 | 12/2007 | Nooren |
| 2008/0004047 A1 | 1/2008 | Hill et al. |
| 2008/0020704 A1 | 1/2008 | Costa et al. |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0125116 A1 | 5/2008 | Jiang |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1* | 1/2011 | Albanes ................ H04W 4/029 |
| | | 455/404.1 |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0158090 A1* | 6/2011 | Riley .................. H04L 12/1403 |
| | | 370/230 |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0307381 A1 | 12/2011 | Kim et al. |
| 2012/0099715 A1 | 4/2012 | Ravishankar et al. |
| 2012/0115512 A1 | 5/2012 | Grainger et al. |
| 2012/0131121 A1 | 5/2012 | Snyder et al. |
| 2012/0203663 A1 | 8/2012 | Sinclair et al. |
| 2012/0207015 A1 | 8/2012 | Marsico |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1* | 9/2014 | Nandlall ................ H04L 67/34 |
| | | 718/1 |
| 2014/0280645 A1 | 9/2014 | Shuman et al. |
| 2014/0378129 A1 | 12/2014 | Jiang et al. |
| 2015/0012415 A1 | 1/2015 | Livne et al. |
| 2015/0094060 A1 | 4/2015 | Kouridakis et al. |
| 2015/0121078 A1 | 4/2015 | Fu et al. |
| 2015/0188979 A1 | 7/2015 | Almeras et al. |
| 2015/0304220 A1 | 10/2015 | Miyao |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |

(56) References Cited

U.S. PATENT DOCUMENTS

| | | | |
|---|---|---|---|
| 2016/0165432 | A1 | 6/2016 | Dubesset et al. |
| 2016/0183178 | A1* | 6/2016 | Marimuthu .......... H04W 60/00 455/432.1 |
| 2016/0219043 | A1 | 7/2016 | Blanke |
| 2016/0269566 | A1 | 9/2016 | Gundamaraju et al. |
| 2016/0292687 | A1 | 10/2016 | Kruglick |
| 2016/0365983 | A1 | 12/2016 | Shahabuddin et al. |
| 2016/0381699 | A1* | 12/2016 | Rubin .................. H04L 1/0027 370/329 |
| 2017/0201778 | A1 | 7/2017 | Bailey et al. |
| 2017/0244676 | A1 | 8/2017 | Edwards |
| 2017/0245207 | A1* | 8/2017 | Stammers ............... H04W 8/24 |
| 2017/0257866 | A1 | 9/2017 | Chaudhuri et al. |
| 2017/0272921 | A1 | 9/2017 | Kim et al. |
| 2017/0289048 | A1 | 10/2017 | Chao et al. |
| 2017/0295201 | A1 | 10/2017 | Peylo et al. |
| 2017/0345006 | A1 | 11/2017 | Kohli |
| 2018/0020324 | A1 | 1/2018 | Beauford |
| 2018/0109632 | A1* | 4/2018 | Stammers ........... H04L 67/1031 |
| 2018/0109953 | A1 | 4/2018 | He |
| 2018/0167906 | A1* | 6/2018 | Chellamani ............. H04W 4/90 |
| 2018/0205698 | A1 | 7/2018 | Gupta et al. |
| 2018/0288127 | A1 | 10/2018 | Zaidi et al. |
| 2018/0288198 | A1 | 10/2018 | Pope et al. |
| 2018/0310162 | A1 | 10/2018 | Kim et al. |
| 2019/0007788 | A1 | 1/2019 | Russell |
| 2019/0037484 | A1 | 1/2019 | Davies et al. |
| 2019/0044932 | A1 | 2/2019 | Kumar et al. |
| 2019/0074982 | A1 | 3/2019 | Hughes |
| 2019/0253885 | A1 | 8/2019 | Bykampadi et al. |
| 2019/0306166 | A1 | 10/2019 | Konda et al. |
| 2019/0342217 | A1 | 11/2019 | Mazurek |
| 2019/0354709 | A1 | 11/2019 | Brinskelle et al. |
| 2020/0007538 | A1* | 1/2020 | Mehta ................ H04L 63/0876 |
| 2020/0053044 | A1 | 2/2020 | Mahalank et al. |
| 2020/0077260 | A1* | 3/2020 | Hancock ............... H04L 61/103 |
| 2020/0169510 | A1 | 5/2020 | Kadosh et al. |
| 2020/0187089 | A1* | 6/2020 | Meredith ............. H04W 24/08 |
| 2020/0221541 | A1 | 7/2020 | Yan |
| 2020/0259896 | A1* | 8/2020 | Sachs ................ H04W 56/0065 |
| 2020/0329363 | A1 | 10/2020 | Mehta |
| 2020/0344604 | A1 | 10/2020 | He |
| 2021/0022070 | A1 | 1/2021 | Letor et al. |
| 2021/0111985 | A1 | 4/2021 | Mahalank et al. |
| 2021/0152494 | A1 | 5/2021 | Johnsen et al. |
| 2021/0168751 | A1 | 6/2021 | Stojanovski et al. |
| 2021/0176177 | A1 | 6/2021 | Kubo et al. |
| 2021/0194903 | A1 | 6/2021 | Medvedovsky et al. |
| 2021/0234706 | A1 | 7/2021 | Nair et al. |
| 2021/0250186 | A1 | 8/2021 | Bykampadi et al. |
| 2021/0297942 | A1 | 9/2021 | Bykampadi et al. |
| 2021/0321303 | A1 | 10/2021 | Nair et al. |
| 2021/0377212 | A1 | 12/2021 | Holtmanns et al. |
| 2021/0399988 | A1 | 12/2021 | Labonte |
| 2021/0406038 | A1 | 12/2021 | Fetzer et al. |
| 2022/0022040 | A1 | 1/2022 | Mahalank et al. |
| 2022/0030413 | A1 | 1/2022 | Ben Henda et al. |
| 2022/0038394 | A1 | 2/2022 | Anubolu et al. |
| 2022/0052847 | A1 | 2/2022 | Gonzalez Cervantes et al. |
| 2022/0070674 | A1 | 3/2022 | Russell |
| 2022/0104020 | A1 | 3/2022 | Rajput et al. |
| 2022/0104112 | A1 | 3/2022 | Rajput et al. |
| 2022/0201489 | A1 | 6/2022 | Mahalank |

FOREIGN PATENT DOCUMENTS

| | | |
|---|---|---|
| CN | 101742445 A | 6/2010 |
| CN | 101917698 A | 12/2010 |
| CN | 102656845 A | 9/2012 |
| CN | 103179504 A | 6/2013 |
| CN | 103444212 A | 12/2013 |
| CN | 107 800 664 A | 3/2018 |
| CN | 110035433 A | 7/2019 |
| CN | 110800322 B | 5/2021 |
| EP | 1 067 492 A2 | 1/2001 |
| EP | 1 906 682 A1 | 4/2008 |
| EP | 2 204 955 A1 | 7/2010 |
| EP | 2 785 125 B1 | 8/2018 |
| EP | 3 493 569 A1 | 6/2019 |
| EP | 3 646 630 B1 | 8/2021 |
| EP | 3 662 630 | 8/2021 |
| ES | 2 548 005 T3 | 10/2015 |
| JP | 7038148 B2 | 3/2022 |
| WO | WO 2001/088790 A1 | 11/2001 |
| WO | WO 2005/091656 A1 | 9/2005 |
| WO | WO 2005/101872 A1 | 10/2005 |
| WO | WO 2007/084503 A2 | 7/2007 |
| WO | WO 2008/053808 A1 | 5/2008 |
| WO | WO-2010/021886 A1 | 2/2010 |
| WO | WO 2010/045646 A2 | 4/2010 |
| WO | WO 2010/105099 A2 | 9/2010 |
| WO | WO 2011/047382 A2 | 4/2011 |
| WO | WO 2016/201990 A1 | 12/2016 |
| WO | WO 2017/082532 A1 | 5/2017 |
| WO | WO 2018/202284 A1 | 11/2018 |
| WO | WO 2019/005287 A1 | 1/2019 |
| WO | WO 2019/027813 A1 | 2/2019 |
| WO | WO 2019/224157 A1 | 11/2019 |
| WO | WO 2020/013889 A1 | 1/2020 |
| WO | WO 2020/033113 A1 | 2/2020 |
| WO | WO 2020/036883 A1 | 2/2020 |
| WO | WO 2020/164763 A1 | 8/2020 |
| WO | WO 2020/210015 A1 | 10/2020 |
| WO | WO 2022/015378 A1 | 1/2022 |
| WO | WO 2022/046176 A1 | 3/2022 |
| WO | WO 2022/132315 A1 | 6/2022 |
| WO | WO 2022/132316 A1 | 6/2022 |

OTHER PUBLICATIONS

International Search Report for International Patent Application Serial No. PCT/US2020/065763 (dated Apr. 6, 2021).
First Examination Report for Indian Patent Application Serial No. 201947047367 (dated Mar. 31, 2021).
Notice of Allowance for Chinese Patent Application Serial No. 201880040477.9 (dated Mar. 29, 2021).
Communication under Rule 71(3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Commonly-assigned, co-pending U.S. Appl. No. 17/185,934 for "Methods, Systems, and Computer Readable Media for Mitigating Location Tracking and Denial of Service (DoS) Attacks that Utilize Access And Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Communication of European publication number and information on the application of Article 67(3) EPC for European Application Serial No. 18756018.0 (dated May 13, 2020).
DeKok, "The Network Access Identifier," Internet Engineering Task Force (IETF), RFC 7542, pp. 1-30 (May 2015).
Croft, N., "On Forensics: A Silent SMS Attack," Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Commonly-assigned, co-pending U.S. Appl. No. 17/129,441 for "Methods, Systems, and Computer Readable Media for Mitigating Spoofing Attacks on Security Edge Protection Proxy (SEPP) Inter-Public Land Mobile Network (INTER-PLMN) Forwarding Interface," (Unpublished, filed Dec. 21, 2020).

(56) References Cited

OTHER PUBLICATIONS

Commonly-assigned, co-pending U.S. Appl. No. 17/129,487 for "Methods, Systems, and Computer Readable Media for Ingress Message Rate Limiting," (Unpublished, filed Dec. 21, 2020).
Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
Commonly-assigned, co-pending U.S. Appl. No. 17/099,683 for "Methods, Systems, and Computer Readable Media for Validating Location Update Messages," (Unpublished, filed Nov. 16, 2020).
Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).
Notice of Allowance and Fee(s) Due and Examiner-Initiated Interview Summary for U.S. Appl. No. 16/379,488 (dated Oct. 23, 2020).
Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Services and System Aspects; Security architecture and procedures for 5G system (Release 16)," 3GPP TS 33.501, V16.4.0, pp. 1-249 (Sep. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Non-Final Office Action for U.S. Appl. No. 16/024,422 (dated Jul. 8, 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).
"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).
Communication of European publication number and information on the application of Article 67(3) EPC for European Application Serial No. 18731923.1 (dated Apr. 8, 2020).
"3rd Generation Partnership Project; Technical Specification Group Services and System Aspects; Security architecture and procedures for 5G system (Release 16)," 3GPP TS 33.501, V16.2.0, pp. 1-227 (Mar. 2020).
"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).
"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).
Sahu et al., "How 5G Registration Works," http://5gblogs.com/5g-registration/, 10 pages (Oct. 12, 2018).
Dierks et al., "The Transport Layer Security (TLS) Protocol Version 1.2," RFC 5246, pp. 1-208 (Aug. 2008).
Housley et al., "Internet X.509 Public Key Infrastructure Certificate and Certificate Revocation List (CRL) Profile," RFC 3280, pp. 1-258 (Apr. 2002).
Communication of European publication number and information on the application of Article 67(3) EPC for European Patent Application Serial No. 19710842.6 (dated Apr. 21, 2021).

(56) References Cited

OTHER PUBLICATIONS

Applicant-Initiated Interview Summary for U.S. Appl. No. 16/100,172 (dated Jun. 9, 2020).
Non-Final Office Action for U.S. Appl. No. 16/100,172 (dated Mar. 6, 2020).
Notice of Allowance and Fee(s) Due and Examiner-Initiated Interview Summary for U.S. Appl. No. 15/666,300 (dated Feb. 13, 2020).
"FS.19 Diameter Interconnect Security," GSMA, pp. 1-3 (Dec. 20, 2019).
"Signalling Security in Telecom SS7/Diameter/5G," Enisa, pp. 1-30 (Mar. 2018).
"GSMA Guidelines for Diameter Firewall," NetNumber Inc., pp. 1-7 (Sep. 12, 2017).
"Oracle Communications Diameter Signaling Router Main Differentiators," Oracle White Paper, pp. 1-10 (Jul. 2017).
"LTE and EPC Roaming Guidelines," GSM Association, Official Document IR.88, V 16.0, pp. 1-90 (Jul. 5, 2017).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Advisory Action and Applicant-Initiated Interview Summary for U.S. Appl. No. 16/100,172 (dated Dec. 20, 2019).
Notification of Transmittal of the International Search Report and the Written Opinion of the International Searching Authority, or the Declaration and Written Opinion of the International Searching Authority for International Application Serial No. PCT/US2019/042203 (dated Nov. 11, 2019).
Applicant-Initiated Interview Summary for U.S. Appl. No. 15/666,300 (dated Oct. 29, 2019).
Final Office Action for U.S. Appl. No. 16/100,172 (dated Oct. 3, 2019).
"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
Notification of Transmittal of the International Search Report and the Written Opinion of the International Searching Authority, or the Declaration for International Application Serial No. PCT/US2019/028814 (dated Aug. 20, 2019).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019).
"Technical Specification Group Core Network and Terminals; Mobile Application Part (MAP) specification (Release 15)," 3GPP TS 29.002, V15.5.0, pp. 1-1024 (Jun. 2019).
Non-Final Office Action for U.S. Appl. No. 15/666,300 (dated Jun. 27, 2019).
Decision on Appeal for U.S. Appl. No. 13/047,287 (Jun. 18, 2019).
Notification of Transmittal of the International Search Report and the Written Opinion of the International Searching Authority, or the Declaration for International Patent Application No. PCT/US2019/018990 (dated May 8, 2019).
Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Non-Final Office Action for U.S. Appl. No. 16/100,172 (dated Apr. 11, 2019).
Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).
Final Office Action for U.S. Appl. No. 15/408,155 (dated Jul. 26, 2018).
Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).
Commonly-assigned, co-pending U.S. Appl. No. 16/024,422 for "Methods, Systems, and Computer Readable Media for Network Node Validation," (Unpublished, filed Jun. 29, 2018).
Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/376,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).

(56) References Cited

OTHER PUBLICATIONS

"Edge Router (DEA)," http://www.mavenir.com/our-products/mobile/edge-router-dea, pp. 1-7 (Copyright 2017).

Non-Final Office Action for U.S. Appl. No. 13/047,287 (dated Aug. 25, 2016).

"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).

"Syniverse Guide to LTE Roaming and Interoperability," https://www.syniverse.com/assets/files/custom_content/lte-roaming-interoperability-guide.pdf, pp. 1-11 (Jan. 8, 2016).

"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).

"Diameter Signaling Control (DSC)," https://www.extent.com/diameter-signaling-control-dsc/, pp. 1-3 (Copyright 2016).

Kotte, "Analysis and Experimental Verification of Diameter Attacks in Long Term Evolution Networks," http://www.diva-portal.org/smash/get/diva2:951619/FULLTEXT01.pdf, pp. 1-72 (2016).

Advisory Action Before the Filing of an Appeal Brief for U.S. Appl. No. 13/047,287 (dated Oct. 16, 2015).

"The Dialogic® Helix™ Signaling Controller," https://www.dialogic.com/-/media/products/docs/brochures/14090-helix-br.pdf, pp. 1-5 (Aug. 2015).

Final Office Action for U.S. Appl. No. 13/047,287 (dated Jun. 4, 2015).

"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).

Non-Final Office Action for U.S. Appl. No. 13/047,287 (dated Sep. 25, 2014).

Supplemental Notice of Allowance and Fee(s) Due for U.S. Appl. No. 12/823,559 (dated Aug. 23, 2013).

Notice of Allowance and Fee(s) Due for U.S. Appl. No. 12/823,559 (dated Aug. 1, 2013).

Email to U.S. Patent and Trademark Office dated Jun. 28, 2013.

Final Office Action for U.S. Appl. No. 12/823,559 (dated Apr. 11, 2013).

Final Office Action for U.S. Appl. No. 13/047,287 (dated Jan. 31, 2013).

Non-Final Office Action for U.S. Appl. No. 12/823,559 (dated Nov. 14, 2012).

"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).

Restriction and/or Election Requirement for U.S. Appl. No. 12/823,559 (dated Aug. 27, 2012).

Notice of Allowance and Fee(s) due for U.S. Appl. No. 12/581,739 (dated Aug. 8, 2012).

Non-Final Office Action for U.S. Appl. No. 13/047,287 (dated Jun. 6, 2012).

Notice of Allowance and Fee(s) Due and Examiner-Initiated Interview Summary for U.S. Appl. No. 12/581,739 (dated May 15, 2012).

Non-Final Office Action for U.S. Appl. No. 12/722,460 (dated Apr. 9, 2012).

"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).

"Net-Net Diameter Director," http://www.oracle.com/us/industries/communications/net-net-diameter-director-ds-1985034.pdf, pp. 1-9 (Copyright 2012).

Final Office Action for U.S. Appl. No. 12/581,739 (dated Dec. 30, 2011).

"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).

Non-Final Office Action for U.S. Appl. No. 12/581,739 (dated Aug. 26, 2011).

Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).

"Solution: Itron Centron GPRS," Data Sheet, http://www.smartsynch.com/SmartSynch_itron_centron.htm, pp. 1-3 (Downloaded from the Internet on Jul. 5, 2011).

Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).

"NES System Architecture," Data Sheet, Copyright 2009, pp. 1-2 (Downloaded from the Internet on Jul. 5, 2011).

"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).

Notification of Transmittal of the Internatioanl Search Report and the Written Opinion of the International Searching Authority, or the Declaration for International Application No. PCT/US2010/027043 (dated Oct. 19, 2010).

"Draft LS on network verification of UE provided location," 3GPP TSG SA WG2 Meeting #81, p. 1 (Oct. 11-15, 2010).

Notification of Transmittal of the International Search Report and the Written Opinion of the International Searching Authority, or the Declaration for International Application No. PCT/US2009/061187 (dated May 17, 2010).

Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).

"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).

"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).

"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).

3rd Generation Partnership Project "Technical Specification Group Core Network and Terminals; Study into routeing of MT-SMs via the HPLMN (Release 7)," 3GPP TR 23.840 V7.1.0 (Mar. 2007).

Hakala et al., "Diameter Credit-Control Application," RFC 4006, pp. 1-115 (Aug. 2005).

Decision to grant a European patent pursuant to Article 97(1) EPC for European Patent Application Serial No. 19710842.6 (dated Feb. 24, 2022).

Notice of Allowance for Chinese Application Serial No. 201880040478.3 (dated Feb. 28, 2022).

Notice of Allowance for Japanese Application Serial No. 2019572174 (dated Feb. 8, 2022).

(56) References Cited

OTHER PUBLICATIONS

Final Office Action for U.S. Appl. No. 17/099,683 (dated Feb. 15, 2022).
Notification of Transmittal of the International Search Report and the Written Opinion of the International Searching Authority, or the Declaration for International Application No. PCT/US2021/057157 (dated Jan. 27, 2022).
Notification Concerning Availability of the Publication of the International Application for International Application No. PCT/US2021/024002 (dated Jan. 20, 2022).
Examination Report for Indian Application Serial No. 202147005810 (dated Jan. 24, 2022).
Examination Report for Indian Application Serial No. 202147001641 (dated Jan. 13, 2022).
Examination Report for Indian Application Serial No. 202047056970 (dated Jan. 13, 2022).
Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished, May 12, 2021).
Nokia et al., "3gpp-Sbi-Consumer-Id," 3GPP TSG-CT WG4 Meeting #101e pp. 1-4 (Nov. 3-13, 2020).
Nokia et al., "SBA Network Function certificate profile," 3GPTT TSG-SA WG3 Meeting #98e pp. 1-5 (Mar. 2-6, 2020).
"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52 (Nov. 2018).
Notification of Transmittal of the International Search Report and the Written Opinion of the International Searching Authority, or the Declaration for International Application No. PCT/US2021/042660 (dated Oct. 26, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).
"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DDLR—Tel!—SMS Test Platform and SMS services, Nov. 6, 2020, pp. 1-6, https://telqtele.com/sms-fake-delivery-receipts-fake-dlr/.
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
Decision to grant a European patent pursuant to Article 97(1) EPC for European Patent Application Serial No. 18756018.0 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926, V16.3.0, pp. 1-60 (Mar. 2020).
"New Annex for the SEPP in TR 33.926," 3GPP TSG-SA WG3 Meeting #95-BIS, pp. 1-6 (Jun. 24-28, 2019).
"N32 message anti-spoofing within the SEPP," 3GPP TSG SA WG3 (Security), Meeting #91, pp. 1-2 (Apr. 16-20, 2018).
Hearing Notice of Indian Application Serial No. 201947047367 (Oct. 11, 2021).
First Office Action for Japanese Application Serial No. 2019572174 (dated Sep. 14, 2021).
Notification of Transmittal of the International Search Report and the Written Opinion of the International Searching Authority, or the Declaration for International Application No. PCT/US2021/033030 (dated Aug. 20, 2021).
First Office Action for Chinese Application Serial No. 201880040478.3 (dated Aug. 26, 2021).
Notification Concerning Availability of the Publication of the International Application for International Application No. PCT/US2020/065763 (dated Jul. 8, 2021).
Non-Final Office Action for U.S. Appl. No. 17/099,683 (dated Sep. 20, 2021).
Examination Report for Indian Application Serial No. 202147030053 (dated Mar. 22, 2022).
Non-Final Office Action for Chinese Application Serial No. 202080007649.X (dated Mar. 2, 2022).
Non-Final Office Action for U.S. Appl. No. 17/076,482 (dated Apr. 1, 2022).
Nokia et al., "Support of the mapping from IP addressing information provided to an AF to the user identity," 3GPP SA WG2 Meeting #142e pp. 1-3 (Nov. 16-20, 2020).

(56) References Cited

OTHER PUBLICATIONS

China Telecom, "KI #13, New Sol: Trigger Procedures for Requesting Analytics," 3GPP SA WG2 Meeting #S2-139E pp. 1-4 (Aug. 19-Sep. 2, 2020).
Notification of Transmittal of the International Search Report and the Written Opinion of the International Searching Authority, or the Declaration for International Application No. PCT/US2021/057156 (dated Mar. 3, 2022).
First Office Action for Japanese Application Serial No. 2021545918 (dated Mar. 8, 2022).
Non-Final Office Action for U.S. Appl. No. 17/129,487 (dated Mar. 21, 2022).

\* cited by examiner

METHODS, SYSTEMS, AND COMPUTER READABLE MEDIA FOR IMPLEMENTING INDIRECT GENERAL PACKET RADIO SERVICE (GPRS) TUNNELING PROTOCOL (GTP) FIREWALL FILTERING USING DIAMETER AGENT AND SIGNAL TRANSFER POINT (STP)

TECHNICAL FIELD

The subject matter described herein relates to implementing firewall functionality for GTP core (GTP-C) signaling traffic. More particularly, the subject matter described herein relates to methods, systems, and computer readable media for implementing indirect GTP firewall filtering to prevent fraud-based attacks using one or more Diameter agents and an STP without intercepting GTP-C roaming signaling.

BACKGROUND

GTP is a group of IP-based communications protocols used to carry GPRS traffic within global system for mobile communications (GSM), universal mobile telecommunication system (UMTS), long term evolution (LTE), and 5G networks. GTP-C is used within the evolved packet core (EPC) network for signaling between serving gateways (SGWs) and packet gateways (PGWs). GTP-C control plane messages are exchanged between SGWs and PGWs to communicate serving gateway capability information to the PGW, to create update, and delete GTP tunnels, and for path management.

Because the PGW is used for Internet traffic, it can be subject to fraud-based attacks from nodes that are impersonating SGWs serving outbound roaming subscribers. An outbound roaming subscriber is a subscriber of a service provider's network that is roaming in another service provider's network. Outbound roaming subscribers can be distinguished from inbound roaming subscribers where a subscriber of another network is roaming in a service provider's home network. Signaling relating to outbound mobile subscribers is particularly subject to fraud-based attacks because an attacker impersonating a serving gateway or mobility management entity (MME) serving a particular subscriber can impersonate the subscriber using the subscriber's international mobile subscriber identity (IMSI), which may not be difficult to obtain. Using the IMSI of a real subscriber, an attacker can establish GTP sessions with a packet gateway and, at a minimum, deny service to real subscribers. The attacker may also obtain subscriber information from the subscriber's home network. One possible way to guard against such attacks is to implement GTP-C firewall functionality at the PGW of the home network. However, implementing GTP-C firewall functionality at the PGW may be burdensome on the network operator in light of the number of PGWs that may be deployed on the network and also on the processing resources of the PGW. For example, the PGW, if equipped to screen GTP-C messages, may have to contact the home subscriber server (HSS) to verify if subscriber is roaming out and then determine whether or not to allow a GTP-C session from a particular MME or serving gateway (SGW) of that roaming network. Such processing would be burdensome on both the PGW and the HSS. The PGW would be required to intercept the GTP-C signaling, query the HSS, receive the response from the HSS, and determine whether to allow the GTP session based on the response. This would be non-standard PGW behavior, as there is no existing standard-defined interface between the PGW and the HSS. The HSS would be required to process queries and responses for every GTP-C-session from every PGW in the network.

Accordingly, there exists a need for implementing GTP firewall functionality without intercepting GTP-C roaming signaling and in a manner that reduces the processing burden on core network nodes.

SUMMARY

A method for implementing indirect GTP firewall filtering includes using a signaling message routing node to dynamically populate an indirect GTP-C firewall filtering database with IMSIs and VPLMN IDs extracted from mobility management signaling messages for updating the locations of outbound roaming subscribers. The method further includes receiving a CCR-I message generated in response to a GTP-C message. The method further includes extracting an IMSI and a VPLMN ID from the CCR-I message. The method further includes accessing the indirect GTP-C firewall filtering database using the IMSI extracted from the CCR-I message. The method further includes determining that a record corresponding to the IMSI is present in the indirect GTP-C firewall filtering database. The method further includes determining that a VPLMN ID in the record does not match the VPLMN ID extracted from the CCR-I message. The method further includes, in response to determining that the VPLMN ID in the record does not match the VPLMN ID extracted from the CCR-I message, rejecting the CCR-I message.

According to another aspect of the subject matter described herein, using a signaling message routing node to dynamically populate the indirect GTP-C firewall filtering database includes, at the signaling message routing node, receiving a Diameter update location request (ULR) message, extracting an IMSI and VPLMN ID from the Diameter ULR message, temporarily storing the IMSI and the VPLMN ID extracted from the Diameter ULR message, determining that updating of the location of the subscriber is successful, and in response to determining that the updating of the subscriber's location is successful, associating the VPLMN ID extracted from the Diameter ULR message with the IMSI extracted from the Diameter ULR message in the indirect GTP-C firewall filtering database.

According to yet another aspect of the subject matter described herein, the signaling message routing node comprises a Diameter edge agent. (DEA)

According to yet another aspect of the subject matter described herein, the signaling message routing node comprises a Diameter relay agent (DRA).

According to yet another aspect of the subject matter described herein, dynamically populating the indirect GTP-C firewall filtering database includes, at the signaling message routing node, receiving a mobile application part (MAP) update location request message, extracting an IMSI and VPLMN ID from the MAP update location request message, temporarily storing the IMSI and the VPLMN ID extracted from the MAP update location request message, determining that the updating of the subscriber's location is successful, and, in response to determining that the updating of the subscriber's location is successful, associating the VPLMN ID with the IMSI extracted from the MAP update location request message in the indirect GTP-C firewall filtering database.

According to yet another aspect of the subject matter described herein, the signaling message routing node comprises a signal transfer point (STP).

According to yet another aspect of the subject matter described herein, the indirect GTP-C firewall filtering database is implemented on a computing platform separate from the signaling message routing node.

According to yet another aspect of the subject matter described herein, the indirect GTP-C firewall filtering database is co-located with the signaling message routing node.

According to yet another aspect of the subject matter described herein, the indirect GTP-C firewall filtering database is located on a computing platform separate from the signaling message routing node and from a home location register (HLR) or home subscriber server (HSS).

According to yet another aspect of the subject matter described herein, the method for indirect GTP-C firewall filtering includes dynamically populating the GTP-C firewall filtering database with international mobile equipment identifiers (IMEs) extracted from mobility management signaling messages, extracting an IMEI value from the CCR-I message, and using the IMEIs in the GTP-C firewall filtering database to screen the CCR-I message.

According to yet another aspect of the subject matter described herein, a system for implementing indirect general packet radio service (GPRS) tunneling protocol (GTP) firewall filtering. The system includes an indirect GTP core (GTP-C) firewall filtering database. The system further includes at least one signaling message routing node configured to dynamically populate the indirect GTP-C firewall filtering database with international mobile subscriber identifiers (IMSIs) and visited public land mobile network identifiers (VPLMN IDs) extracted from mobility management signaling messages for updating locations of outbound roaming subscribers, receive a credit control request-initial (CCR-I) message generated in response to a GTP-C message, extract an IMSI and a VPLMN ID from the CCR-I message, access the indirect GTP-C firewall filtering database using the IMSI extracted from the CCR-I message, determine that a record corresponding to the IMSI is present in the indirect GTP-C firewall filtering database, determine that a VPLMN ID in the record does not match the VPLMN ID extracted from the CCR-I message, and, in response to determining that the VPLMN ID in the record does not match the VPLMN ID extracted from the CCR-I message, reject the CCR-I message.

According to yet another aspect of the subject matter described herein, the at least one signaling message routing node is configured to dynamically populate the indirect GTP-C firewall filtering database by receiving a Diameter update location request (ULR) message, extracting an IMSI and VPLMN ID from the Diameter ULR message, temporarily storing the IMSI and the VPLMN ID extracted from the Diameter ULR message, determining that the updating of the subscriber's location is successful, and, in response to determining that the updating of the subscriber's location is successful, associating the VPLMN ID extracted from the Diameter ULR message with the IMSI extracted from the Diameter ULR message in the indirect GTP-C firewall filtering database.

According to yet another aspect of the subject matter described herein, the at least one signaling message routing node comprises a Diameter edge agent (DEA).

According to yet another aspect of the subject matter described herein, the at least one signaling message routing node comprises a Diameter relay agent (DRA).

According to yet another aspect of the subject matter described herein, the at least one signaling message routing node is configured to dynamically populate the indirect GTP-C firewall filtering database by receiving a mobile application part (MAP) update location request message, extracting an IMSI and VPLMN ID from the MAP update location request message, temporarily storing the IMSI and the VPLMN ID extracted from the MAP update location request message, determining that the updating of the subscriber's location is successful, and, in response to determining that the updating of the subscriber's location is successful, associating the VPLMN ID with the IMSI extracted from the MAP update location request message in the indirect GTP-C firewall filtering database.

According to yet another aspect of the subject matter described herein, the at least one signaling message routing node comprises a signal transfer point (STP) for dynamically populating the GTP-C firewall filtering database and a Diameter agent for receiving the CCR-I message generated in response to the GTP-C message, extracting the IMSI and the VPLMN ID from the CCR-I message, accessing the indirect GTP-C firewall filtering database using the IMSI extracted from the CCR-I message, determining that a record corresponding to the IMSI is present in the indirect GTP-C firewall filtering database, determining that the VPLMN ID in the record does not match the VPLMN ID extracted from the CCR-I message, and, in response to determining that the VPLMN ID in the record does not match the VPLMN ID extracted from the CCR-I message, rejecting the CCR-I message.

According to yet another aspect of the subject matter described herein, the indirect GTP-C firewall filtering database is co-located with the signaling message routing node.

According to yet another aspect of the subject matter described herein, the indirect GTP-C firewall filtering database is located on a computing platform separate from the signaling message routing node and from a home location register (HLR) or home subscriber server (HSS).

According to yet another aspect of the subject matter described herein, the at least one signaling message routing node is configured to dynamically populate the GTP-C firewall filtering database with international mobile equipment identifiers (IMEIs) extracted from mobility management signaling messages, extract an IMEI value from the CCR-I message, and use the IMEIs in the GTP-C firewall filtering database to screen the CCR-I message.

According to yet another aspect of the subject matter described herein, a non-transitory computer readable medium having stored thereon executable instructions that when executed by a processor of a computer control the computer to perform steps is provided. The steps include using a signaling message routing node to dynamically populate an indirect general packet radio service (GPRS) tunneling protocol core (GTP-C) firewall filtering database with international mobile subscriber identifiers (IMSIs) and visited public land mobile network identifiers (VPLMN IDs) extracted from mobility management signaling messages for updating locations of outbound roaming subscribers. The steps further include receiving a credit control request-initial (CCR-I) message generated in response to a GTP-C message. The steps further include extracting an IMSI and a VPLMN ID from the CCR-I message. The steps further include accessing the indirect GTP-C firewall filtering database using the IMSI extracted from the CCR-I message. The steps further include determining that a record corresponding to the IMSI is present in the indirect GTP-C firewall filtering database. The steps further include determining that a VPLMN ID in the record does not match the VPLMN ID extracted from the CCR-I message. The steps further include, in response to determining that the VPLMN ID in the record does not match the VPLMN ID extracted from the CCR-I message, rejecting the CCR-I message.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein implements GTP-C firewall functionality using an indirect GTP-C firewall filtering database populated by a DEA, DRA, and/or STP and using the database to screen GTP-C traffic without intercepting GTP-C roaming signaling. Such a database provides for GTP-C-signaling-based fraud detection when an attacker tries to masquerade as a node serving a legitimate outbound roaming subscriber. Because the solution does not require interception of GTP-C roaming signaling traffic, PGW implementation is simplified. The solution described herein provides the capability to indirectly detect fraudulent GTP-C roaming signaling traffic at DEAs and DRAs based on Diameter messages sent to the DEAs and DRAs in response to GTP-C roaming signaling traffic. The DEAs and DRAs may receive create connection request messages generated in response to GTP-C session creation requests sent by attackers. The DEAs and DRAs may utilize subscriber PLMN information obtained either from Diameter location update signaling transactions maintained in an indirect GTP-C firewall filtering database or subscriber roaming information obtained from SS7 signal messaging traffic stored by an STP in the indirect GTP-C firewall filtering database.

As indicated above, GTP-C traffic is used for session management, information management, and location management, which enables UEs to access the internet. By providing an efficient screening mechanism for such traffic, core network security is enhanced and in a more efficient way than implementing such screening at the PGW based on GTP-C traffic.

Figure 1:
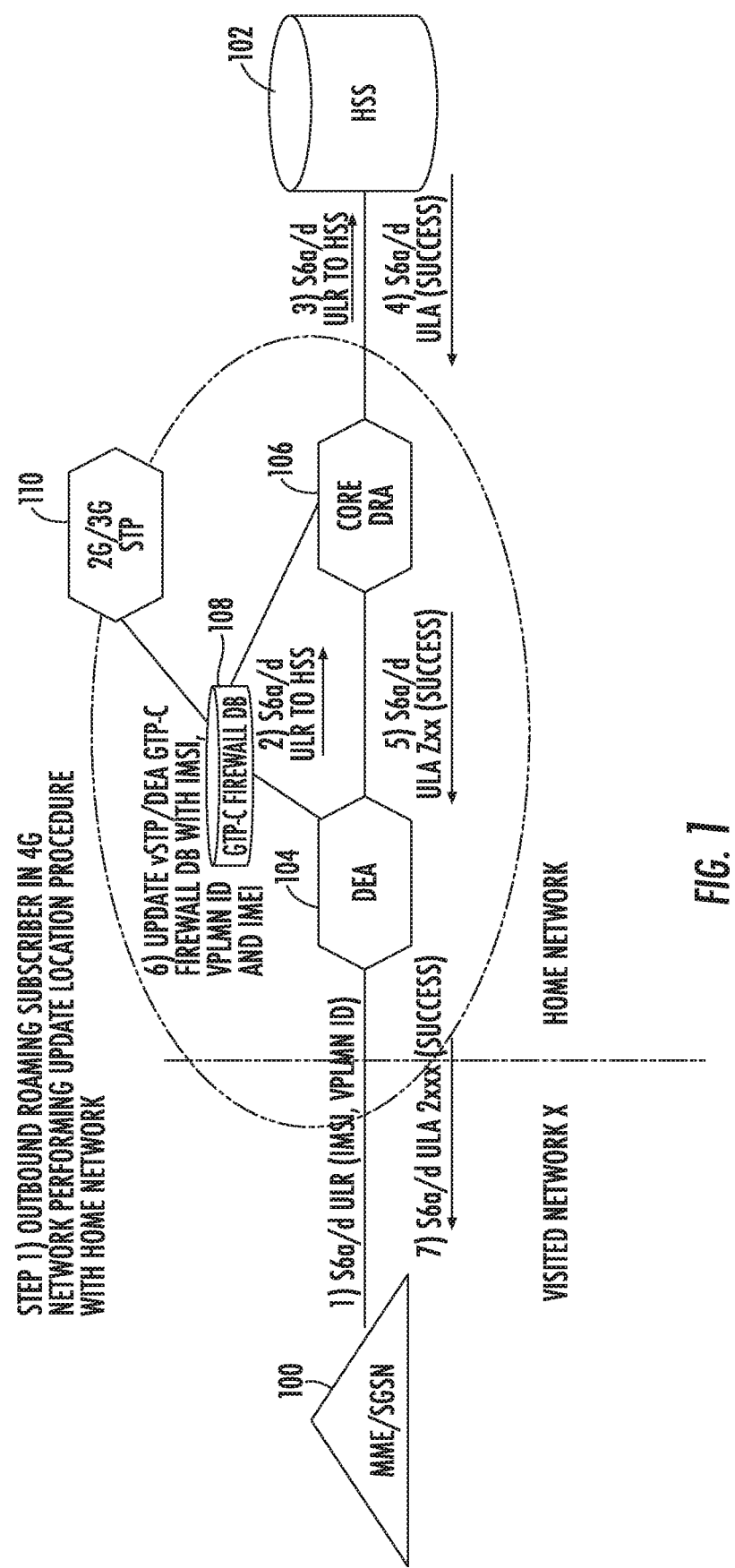
FIG. 1 is a network diagram illustrating exemplary messaging for an outbound roaming subscriber in a 4G network performing an update location procedure with the home network.

FIG. 1 is a network diagram illustrating exemplary network nodes and messaging associated with an outbound roaming subscriber performing an update location procedure. Referring to FIG. 1, when a subscriber roams to a visited network the mobility management entity (MME) or serving GPRS support node (SGSN) 100 will initiate a Diameter update location transaction with the core network. In the illustrated example, MME/SGSN 100 sends an update location request to the subscriber's home network. The update location request is intended to update the location of the subscriber with a home subscriber server (HSS) 102 in the home network. In particular, according to third generation partnership project (3GPP) TS 29.272, the update location procedure is used between the MME and the HSS and between the SGSN and the HSS to update location information in the HSS. Table 1 shown below illustrates exemplary parameters that may be included in an update location request message.

TABLE 1

Update Location Request AVPs

| Information element name | Mapping to Diameter Attribute Value Pair (AVP) | Cat. | Description |
| --- | --- | --- | --- |
| IMSI | User-Name (See Internet Engineering Task Force (IETF) Request for Comments (RFC) 6733 [61]) | M | This information element shall contain the user IMSI, formatted according to 3GPP TS 23.003 [3], clause 2.2. |
| Supported Features (See 3GPP TS 29.229 [9]) | Supported-Features | O | If present, this information element shall contain the list of features supported by the origin host. |

TABLE 1-continued

Update Location Request AVPs

| Information element name | Mapping to Diameter Attribute Value Pair (AVP) | Cat. | Description |
|---|---|---|---|
| Terminal Information (See 7.3.3) | Terminal-Information | O | This information element shall contain information about the user's mobile equipment. Within this Information Element, only the IMEI and the Software-Version AVPs shall be used on the S6a/S6d interface. |
| ULR Flags (See 7.3.7) | ULR-Flags | M | This Information Element contains a bit mask. See 7.3.7 for the meaning of the bits. |
| Visited PLMN Id (See 7.3.9) | Visited-PLMN Id | M | This IE shall contain the mobile country code (MCC) and the mobile network code (MNC), see 3GPP TS 23.003 [3]. It may be used to apply roaming based features. |
| Equivalent PLMN List (See 7.3.151) | Equivalent-PLMN-List | O | This Information Element shall contain the equivalent PLMN list of which the MME/SGSN requests the corresponding closed subscriber group (CSG) Subscription data. |
| RAT Type (See 7.3.13) | RAT-Type | M | This Information Element contains the radio access type the UE is using. See clause 7.3.13 for details. |
| SGSN number (See 7.3.102) | SGSN Number | C | This Information Element contains the integrated services digital network(ISDN)number of the SGSN, see 3GPP TS 23.003 [3], It shall be present when the message is sent on the S6d interface and the SGSN supports LCS (using MAP based Lg interface) or short message service (SMS) functionalities or the Gs interface. It may be present when the message is sent on the S6a interface and the requesting node is a combined MME/SGSN. |
| Homogeneous Support of IMS Voice Over PS Sessions | Homogeneous-Support-of-IMS-Voice-Over-PS-Sessions | O | This Information Element, if present, indicates whether or not "IP multimedia subsystem (IMS) Voice over "PS Sessions is supported homogeneously in all TAs or RAs in the serving node (MME or SGSN or combined MME/SGSN). The value "SUPPORTED" indicates that there is support for "IMS Voice over PS Sessions" in all TAs or RAs. The value "NOT_SUPPORTED" indicates that there is not support for "IMS Voice over PS Sessions" in any of the TAs or RAs. |
| Visited gateway mobile location center (V-GMLC) Address | GMLC Address | C | This Information Element shall contain, if available, the IPv4 or IPv6 address of the V-GMLC associated with the serving node. |
| Active access point name (APN) | Active-access point name (APN) | O | This Information Element, if present, contains the list of active APNs stored by the MME or SGSN, including the identity of the packet date network gateway (PDN GW) assigned to each APN. For the case of explicitly subscribed APNs, the following information shall be present: Context-Identifier: context id of subscribed APN in use Service-Selection: name of subscribed APN in use- MIP6-Agent-Info: including PDN GW identity in use for subscribed APN Visited-Network-Identifier: identifies the PLMN where the PDN GW was allocated For the case of the Wildcard APN, the following information shall be present: Context-Identifier: context id of the Wildcard APN |

TABLE 1-continued

Update Location Request AVPs

| Information element name | Mapping to Diameter Attribute Value Pair (AVP) | Cat. | Description |
| --- | --- | --- | --- |
| | | | Specific-APN-Info: list of APN-in use and related PDN GW identity when the subscribed APN is the wildcard APN It may be present when MME or SGSN needs to restore PDN GW data in HSS due to a Reset procedure. |
| User equipment (UE) single radio voice call continuity (SRVCC) Capability | UE-SRVCC Capability | C | This information element shall indicate if the UE supports or does not support the SRVCC capability and shall be present if the MME or the SGSN supports SRVCC and this information is available to the MME or the SGSN. |
| MME Number for MT SMS | MME-Number for-mobile terminated short message service (MT-SMS) | C | This Information Element contains the ISDN number of the MME to route SMS to the UE through the MME, see 3GPP TS 23.003 [3]. It shall be present when the MME supports SMS in MME and wishes to provide SMS in MME. |
| SMS Register Request | SMS-Register-Request | C | This information element is used to inform the HSS if the MME or the SGSN needs to be registered for SMS, prefers not to be registered for SMS or has no preference. It shall be present when the MME supports SMS in MME and requests to be registered for SMS. It shall be present when the SGSN supports "SMS in SGSN" as defined in clause 5.3.18 in 23.060 [12], and requests to be registered for SMS. |
| SGs MME Identity | SGs-MME Identity | O | This information element is used to inform the HSS of the MME identity that the MME will use over the SGs interface. This information element shall be present, if the MME supports this information element and if the MME identity used over SGs is different from the MME Diameter identity used over S6a. |
| Coupled node's Diameter identity | Coupled-Node-Diameter-ID | O | This information element contains the Diameter identity of the coupled node (i.e. MME's Diameter identity for the SGSN and SGSN's Diameter identity for the MME) when the message is sent by the combined MME/SGSN. This information element may be present when the message is sent on the S6a/S6d interface and the requesting node is a combined MME/SGSN. |
| Adjacent PLMNs | Adjacent-PLMNs | O | This information element, if present, shall contain the list of PLMNs where an UE served by the MME/SGSN is likely to make a handover from the PLMN where the MME/SGSN is located. This list is statically configured by the operator in the MME/SGSN, according to the geographical disposition of the different PLMNs in that area, the roaming agreements, etc . . . |
| Supported Services (3GPP TS 29. 336 [54]) | Supported-Services | O | If present, this Information Element shall contain attribute value pairs (AVPs) indicating details of the services supported by the MME/SGSN. |

In Table 1, it can be seen that the update location request message includes as a mandatory parameter the IMSI of the subscriber and the visited PLMN identifier. These parameters may be used to perform indirect GTP-C firewall filtering, as will be described in detail below. Another parameter that may be more information element that may be used to perform indirect GTP-C firewall filtering is the IMEI.

DEA 104 receives the update location request message from MME/SGSN 100 and may store the IMSI, visited PLMN (VPLMN) ID, and IMEI temporarily until the information is validated by the HSS. One reason that DEA 104 may not store these parameters in its Indirect GTP-C firewall filtering database initially is that the update location request message may be initiated by an attacker. Only after successful validation by the HSS will DEA 104 store the parameters identifying the location of an outbound roaming subscriber in its GTP-C screening database.

In step 2 in the call flow diagram, DEA 104 forwards the ULR message to core Diameter relay agent (DRA) 106. In step 3, core DRA 106 forwards the S6A ULA message to HSS 102.

HSS 102 may validate the ULR message and, if validation is successful, update the subscriber's location in a database maintained by HSS 102. In step 4, HSS 102 sends an update location answer (ULA) message indicating successful updating of the subscriber's location to core DRA 106. In step 5, core DRA 106 forward the S6A ULA message to DEA 104. In step 6, DEA 104 updates an indirect GTP-C firewall filtering database 108 with the IMSI, VPLMN ID, and optionally, the IMEI previously extracted from the ULR message. As will be described in more detail below, the records in indirect GTP-C firewall filtering database 108 will be used to screen GTP-C traffic without requiring interception of the GTP-C traffic. In step 7, DEA 104 forwards the ULA message to MME/SGSN 100.

It should also be noted that FIG. 1 also includes STP 110. STP 110 may also dynamically populate indirect GTP-C firewall filtering database 108 with subscriber location information obtained from SS7 signaling messages.

Table 2 shown below illustrates an example of an entry that may be populated in indirect GTP-C firewall filtering database 108 after the call flow illustrated in FIG. 2.

TABLE 2

| Example Indirect GTP-C Firewall Filtering Database Record | | |
|---|---|---|
| IMSI | VPLMN ID | IMEI |
| IMSI_1 | Visited Network X | IMEI_1 |

In Table 2, the record includes the IMSI for the outbound roaming subscriber, the identity of the visited network (i.e., the VPLMN ID), and the IMEI.

Once the database is populated with subscriber information, the database can be used to screen GTP-C messages. FIG. 2 is a network and message flow diagram illustrating the use of indirect GTP-C firewall filtering database 108 to indirectly screen GTP-C messages. Referring to FIG. 2, in step 1, an attacker masquerades as a serving gateway serving a fictitious outbound mobile subscriber. The purpose of such an attack may be to create a session between the attacker and a core network node such as packet gateway 202 to send attack traffic to the core network. The attacker initiates the attack by sending a GTP-C create session request message with an IMSI and a VPLMN ID of the serving network. In one example, the IMSI may be the IMSI of a subscriber that is actually provisioned in the network and the VPLMN ID may be a false network corresponding to the attacker, rather than the network currently serving the outbound roaming subscriber. The GTP-C create session request is sent to the home network packet gateway 202 as part of a packet data network session establishment procedure. The GTP-C create session request may include a user location information element which stores the VPLMN ID. If the GTP-C create connection request is a legitimate create connection request from a real outbound roaming subscriber, the VPLMN ID may be the ID of the VPLMN in which the subscriber is roaming. However, if the GTP-C create connection request originates from an attacker the VPLMN ID may be the VPLMN that identifies the network in which the attacker is located. An additional information element that may be included in the GTP-C create connection request is the IMSI, which contains the 15 digit identifier of the UE. In this example, it is assumed that the attacker has obtained the IMSI of a real outbound roaming subscriber and inserts a false VPLMN ID in the GTP-C create session request.

In step 2 of the message flow diagram PGW 202 receives the GTP-C create session request and, in response, formulates and sends a credit control request-initial (CCR-I) message addressed to policy and charging rules function (PCRF) 204. The CCR-I message is sent from the PGW to the PCRF in order to request policy and charging control rules for a bearer and to provision IP flow mobility routing rules. The CCR-I message contains a subscription-ID attribute value pair (ADP), which stores the IMSI of the subscriber. The CCR-I message also includes a 3GPP-location-info AVP, which stores an indication of the current location of the subscriber, such as the VPLMN ID of the network serving the subscriber. In this example, the VPLMN ID may be one inserted by SGW 200, rather than the actual VPLMN ID serving the subscriber.

In step 3 in the message flow diagram, DRA 106 performs a lookup in indirect GTP-C firewall filtering database 108 using the IMSI received in the CCR-I message. In this example, it is assumed that a record is present in indirect GTP-C firewall filtering database 108 and that a VPLMN ID is present in the record. Accordingly, DRA 106 retrieves the VPLMN ID corresponding to the IMSI from indirect GTP-C firewall filtering database 108. In step 4 in the message flow diagram, DRA 106 compares the VPLMN ID extracted from the database record with the VPLMN ID received in the CCR-I message. In this example, it is assumed that the VPLMN ID stored for the IMSI in database 108 is different from the VPLMN ID received in the CCR-I message. Accordingly, in step 5, DRA 108 sends a message to PGW 202 indicating a mismatch with the VPLMN ID or, alternatively, record not found if there is no record present in database 108 corresponding to the IMSI. The message from core DRA 106 to PGW 202 may be a credit control answer-initial (CCA-1) message with a result code indicating that the GTP-C create session request should be rejected. In step 6 of the message flow diagram, PGW 202 creates and sends a GTP-C create session response to SGW 200 with an error code indicating APN access denied-no subscription.

Figure 2:
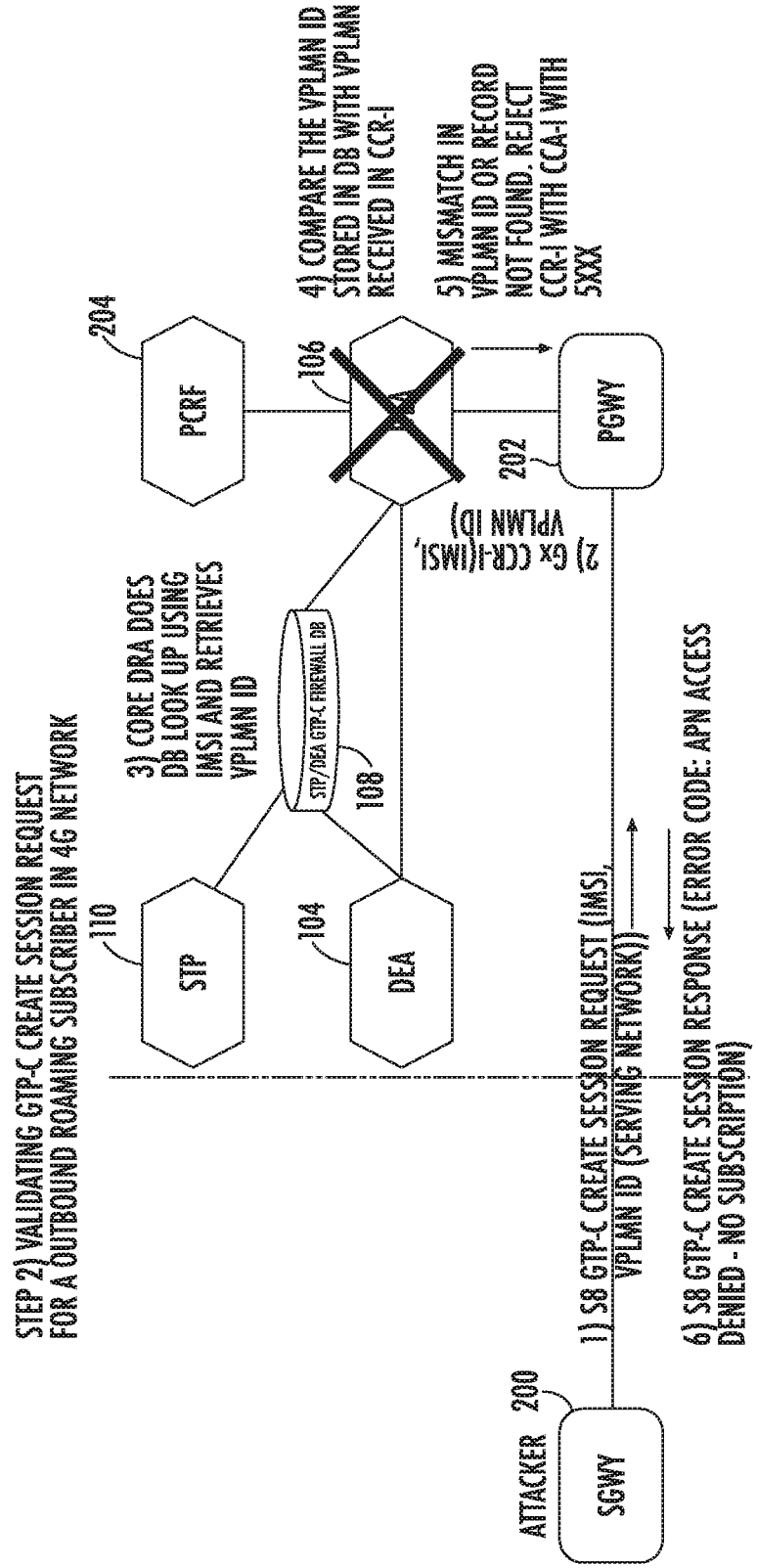
FIG. 2 is a network diagram illustrating exemplary messaging for validating a GTP-C create session request for an outbound roaming subscriber in the 4G network.

Thus, using the steps in FIG. 2, subscriber roaming data obtained from Diameter update location transactions is used to indirectly screen for fraudulent GTP-C traffic. Such an approach is advantageous over implementing screening directly at PGW 202 where the PGW 202 is required to interrogate the HLR or the HSS to obtain the subscriber's location or to store the subscriber's location locally at the PGW. In such an example, a DEA and/or a DRA can perform GTP-based fraud detection without intercepting GTP messages. The solution illustrated in FIGS. 1 and 2 avoids the need for a dedicated GTP firewall from mobile network operators. Instead, DEA 104 and/or DRA 106 indirectly implements a GTP firewall by blocking create connection request traffic that is generated in response to GTP-C create session request traffic.

Although in the example illustrated in FIGS. 1 and 2, the DEA dynamically populates indirect GTP-C firewall filtering database 108 with the subscriber's current location and DRA 106 uses the record in database 108 to perform the GTP-C firewall functionality, the subject matter described herein is not limited to such an implementation. In an alternate implementation, DEA 104 can dynamically populate indirect GTP-C firewall filtering database 108 with subscriber location information obtained from an update location transaction, and DEA 104 can screen the create connection traffic using the records stored in database 108.

Figure 3:
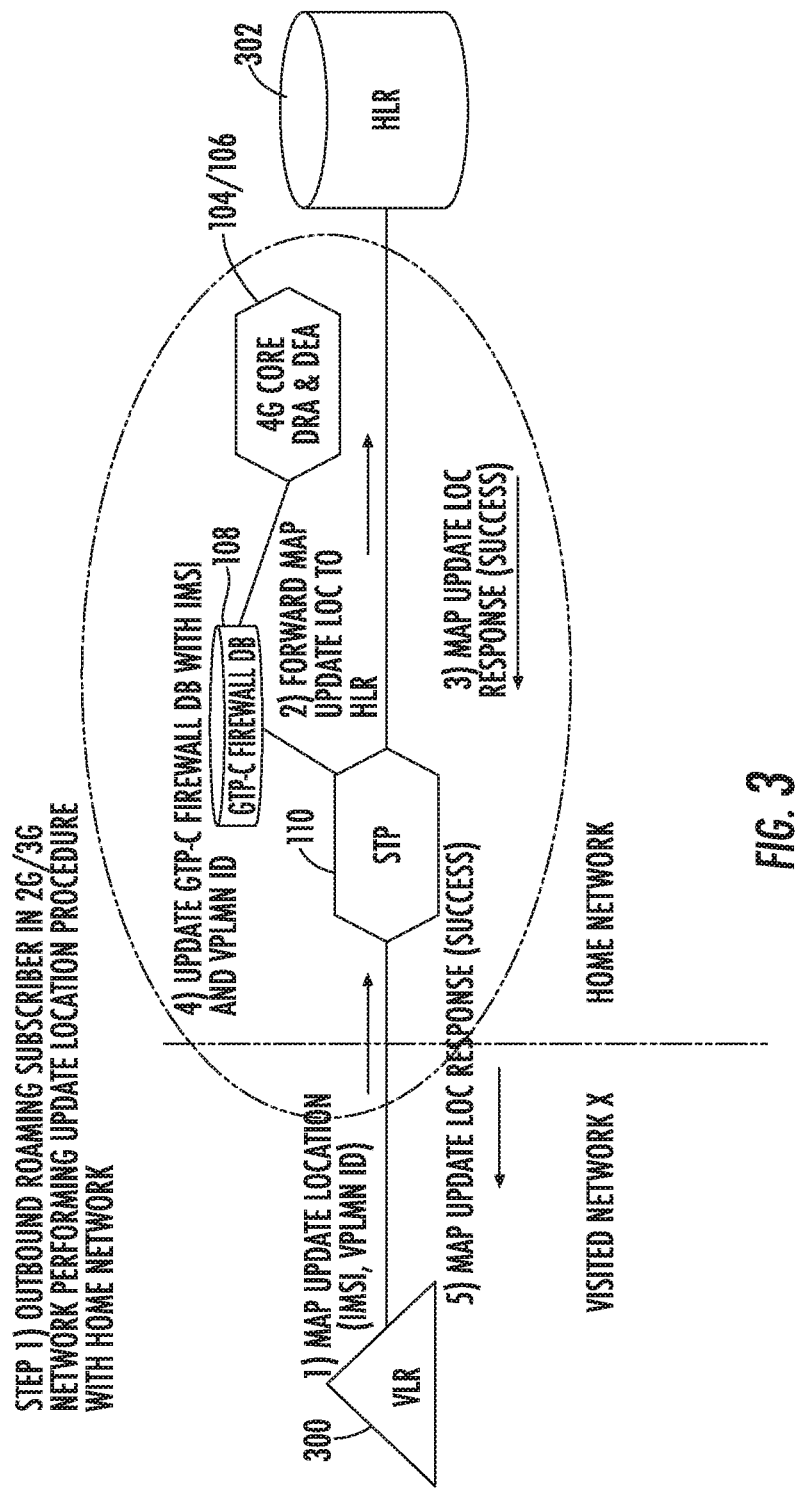
FIG. 3 is a network diagram illustrating exemplary messaging associated with an outbound roaming subscriber in a second generation/third generation (2G/3G) network performing an update location procedure with a home network.

In yet another alternate implementation, database 108 can be populated using subscriber location information obtained by a signal transfer point, such as STP 110. FIG. 3 is a network diagram illustrating exemplary messaging associated with populating indirect GTP-C firewall filtering database 108 using subscriber location information obtained by STP 110. Referring to FIG. 3, in line 1 of the message flow diagram, when a subscriber roams into a visited 2G or 3G network, the visitor location register (VLR) 300 serving a roaming subscriber in a visited network sends a mobile application part (MAP) update location request to a home location register (HLR) 302 in the subscriber's home network. The map update location request message includes the IMSI of the subscriber and the VPLMN ID identifying visited network x where the subscriber is currently roaming. STP 110 receives the map update location request and temporarily stores the IMSI and the VPLMN ID for the transaction. In line 2 of the message flow diagram, STP 110 forwards the MAP update location request to HLR 302. HLR 302 validates the update location request and, if validated, updates the subscriber's location in its local location database.

In line 3 of the message flow diagram, HLR 302 sends a MAP update location response indicating successful updating of the subscriber location to VLR 300. HLR 302 forwards the update location response to STP 110.

In step 4 of the message flow diagram, STP 110 updates indirect GTP-C firewall filtering database 108 with the IMSI and the VPLMN ID previously stored by STP 110 in response to receiving the map update locations request. Updating indirect GTP-C firewall filtering database 108 may include determining whether a record exists corresponding to the IMSI. If a record exists corresponding to the IMSI, STP 110 may update the VPLMN ID in the record with the VPLMN ID received in the map update location request message. If database 108 does not include a record corresponding to the IMSI, STP 110 may create a new record in the database mapping the IMSI to the VPLMN ID received in the update location request message. STP 110 may also store the IMEI in the record. After being updated or newly created the record may appear as illustrated above in Table 1.

Like the example illustrated in FIG. 1, STP 110 only populates database 108 with the mapping between the VPLMN ID and the IMSI upon receiving confirmation from the HLR that the update location transaction was successful. The reason for waiting until receiving confirmation that the update location transaction is successful is the reduce the likelihood that an attacker can impersonate VLR 300 and populate database 108 with false location information for the subscriber.

In addition, in the example illustrated in FIG. 3, database 108 is populated by an STP. It is understood that database 108 may be populated by a physical or a virtual STP without departing from the scope of the subject matter described herein. Such an STP may be a physical on premises node residing in a service provider's network or a virtual STP that resides in a network cloud that is hosted by the service provider or by a cloud service provider.

Figure 4:
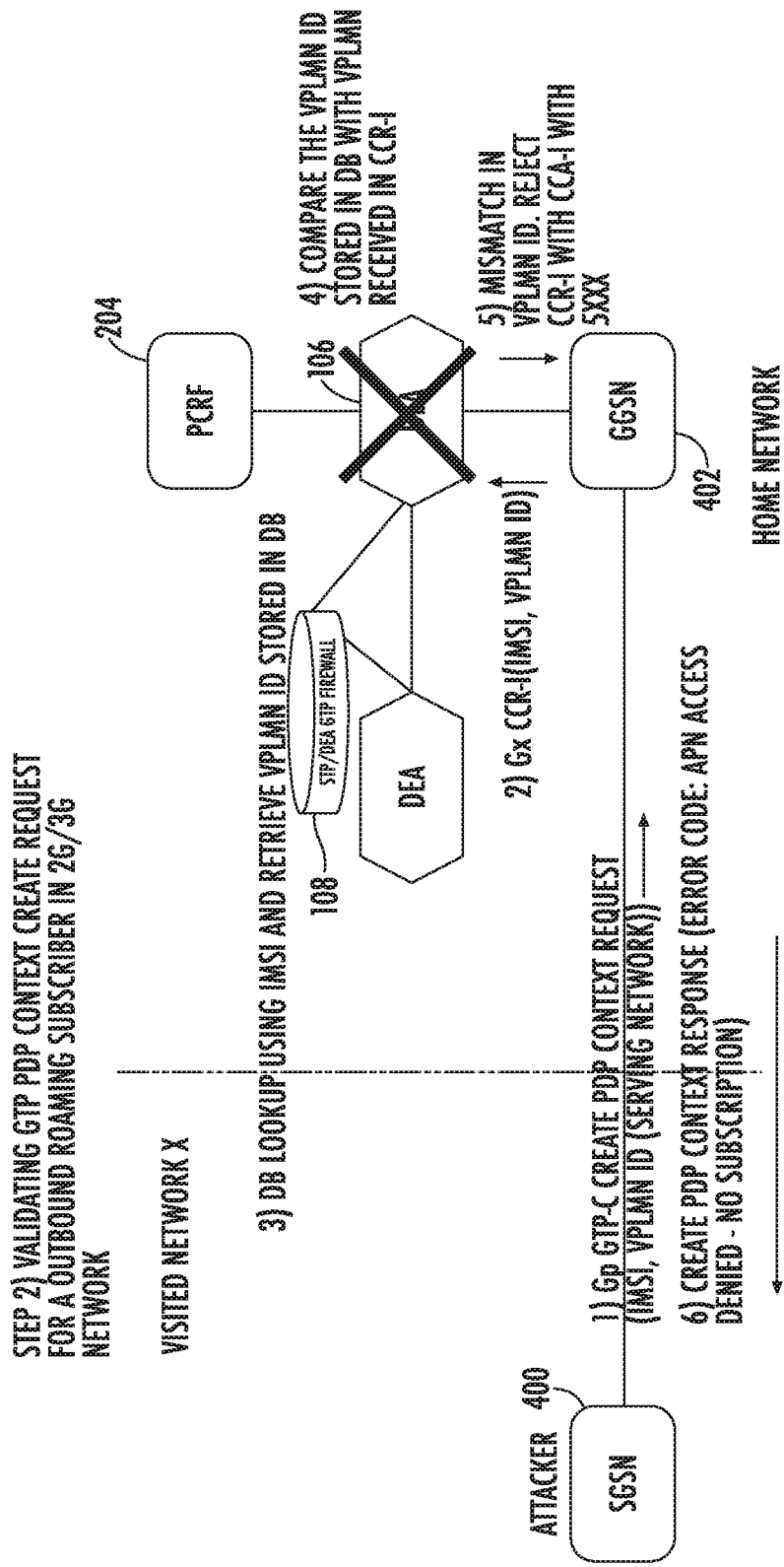
FIG. 4 is a network diagram illustrating exemplary messaging associated with validating a GTP PDP context create request for an outbound roaming subscriber in a 2G/3G network.

FIG. 4 is a network and message flow diagram illustrating exemplary messaging used to screen GTP-C traffic for outbound roaming subscribers in 2G/3G network. Referring to FIG. 4, an attacker masquerades as an SGSN 400 serving an outbound mobile subscriber in a 2G or 3G visited network. The attacker starts the attack in step 1 by sending a GTP-C create PDP context request message to GGSN 402 located in the subscriber's home network. The GTP-C create PDP context request includes the IMSI and VPLMN ID that in this example identifies the network of the attacker, rather than the VPLMN ID currently serving the subscriber corresponding to the IMSI.

GGSN 402 receives the GTP-C create PDP context request message and formulates and sends a CCR-I message to PCRF 204. The CCR-I message includes the IMSI, the VPLMN ID, and the IMEI from the GTP-C message. GGSN 402 forwards the CCR-I message to DRA 106.

In step 4 of the message flow diagram, DRA 106 compares the VPLMN ID stored in indirect GTP-C firewall filtering database 108 corresponding to the IMSI with the VPLMN ID extracted from the CCR-I message. In this example, it is assumed that there is a mismatch between the IMSI and the VPLMN ID. Accordingly, in line 5, DRA 106 rejects the CCR-I message by sending a CCA-I message with a 5XXX response code to GGSN 402. In response to receiving the CCA-I message with the rejection response code, GGSN 402 sends a create PDP context response to attacker 400 indicating APN access denied-no subscription. Accordingly, using the steps illustrated in FIG. 4, a database populated by an STP can be used to screen attackers masquerading as SGSNs in visited 2G or 3G networks.

Figure 5:
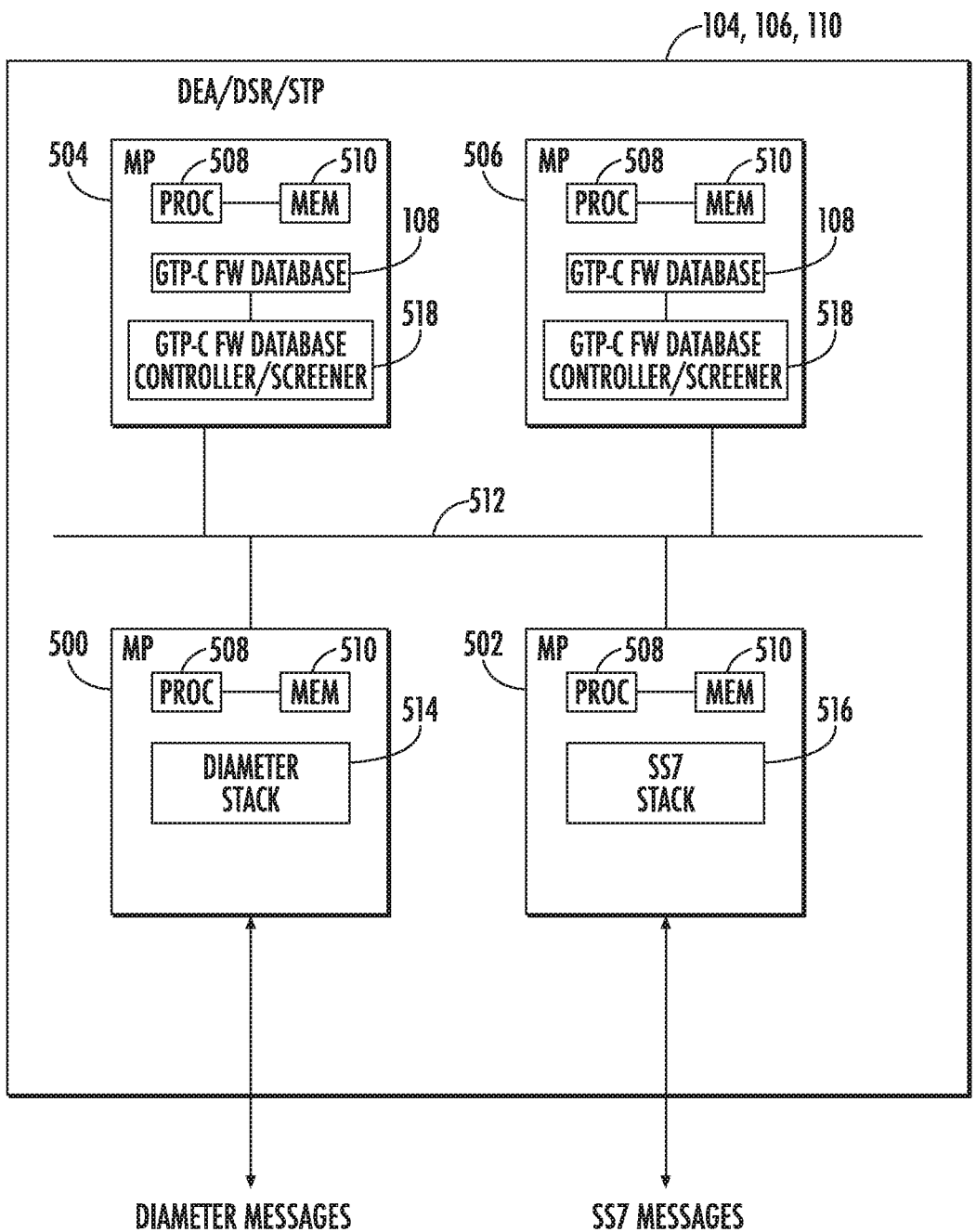
FIG. 5 is a block diagram illustrating an exemplary architecture of a DEA/DRA/STP node for creating a GTP-C screening database and for using the database to implement GTP-C firewall functionality without intercepting GTP-C signaling.

FIG. 5 is a block diagram illustrating an exemplary internal architecture for DEA/DRA/STP 104, 106, or 110 for implementing the subject matter described above with regard to FIGS. 1 through 4. In the example illustrated in FIG. 5, DEA/DRA/STP 104, 106, or 110 includes Diameter routing as well as SS7 routing capabilities. It is understood that the functions could be implemented in the same real or virtual network node or could be implemented in separate network nodes. Referring to the architecture illustrated in FIG. 5, DEA/DRA/STP 104, 106, or 110 includes a plurality of message processors (MPs) 500, 502, 504, and 506. Each message processor 500, 502, 504, and 506 includes at least one processor 508 and memory 510. Each message processor 500, 502, 504, and 506 may be implemented using a printed circuit board and corresponding traces for interconnecting the components mounted on the circuit board. Message processors 500, 502, 504, and 506 may communicate with each other using an internal communications medium 512, which in one example is an Ethernet communications medium.

Message processor 500 implements DEA and/or DRA functionality. Accordingly, message processor 500 includes a Diameter protocol stack 514 that implements diameter connection and routing functionality. Thus, Diameter stack 514 may initiate or respond to Diameter connections with diameter peers and route messages based on diameter layer information it the messages.

Message processor 502 implements SS7 routing functionality. Accordingly, message processor 502 includes an SS7 protocol stack 516 for routing SS7 messages based on message transfer part (MTP) level 3 information in the messages. SS7 stack 516 may also implement SIGTRAN protocols for carrying SS7 messages over IP networks.

Message processor 504 and 506 each implement GTP-C firewall functionality using indirect GTP-C firewall filtering database 108. In the illustrated example, message processors 504 and 506 may be identically provisioned with a copy of GTP firewall database 108, and message processors 500 and 502 may load balance messages requiring GTP-C firewall screening between message processors 500 and 506. In addition, each message processor 504 and 506 includes an indirect GTP-C firewall filtering database controller/ screener 518 for screening create connection request messages using subscriber location information populated in database 108 and for dynamically populating database 108 using information received from Diameter or SS7 update location messages for roaming subscribers.

Figure 6:
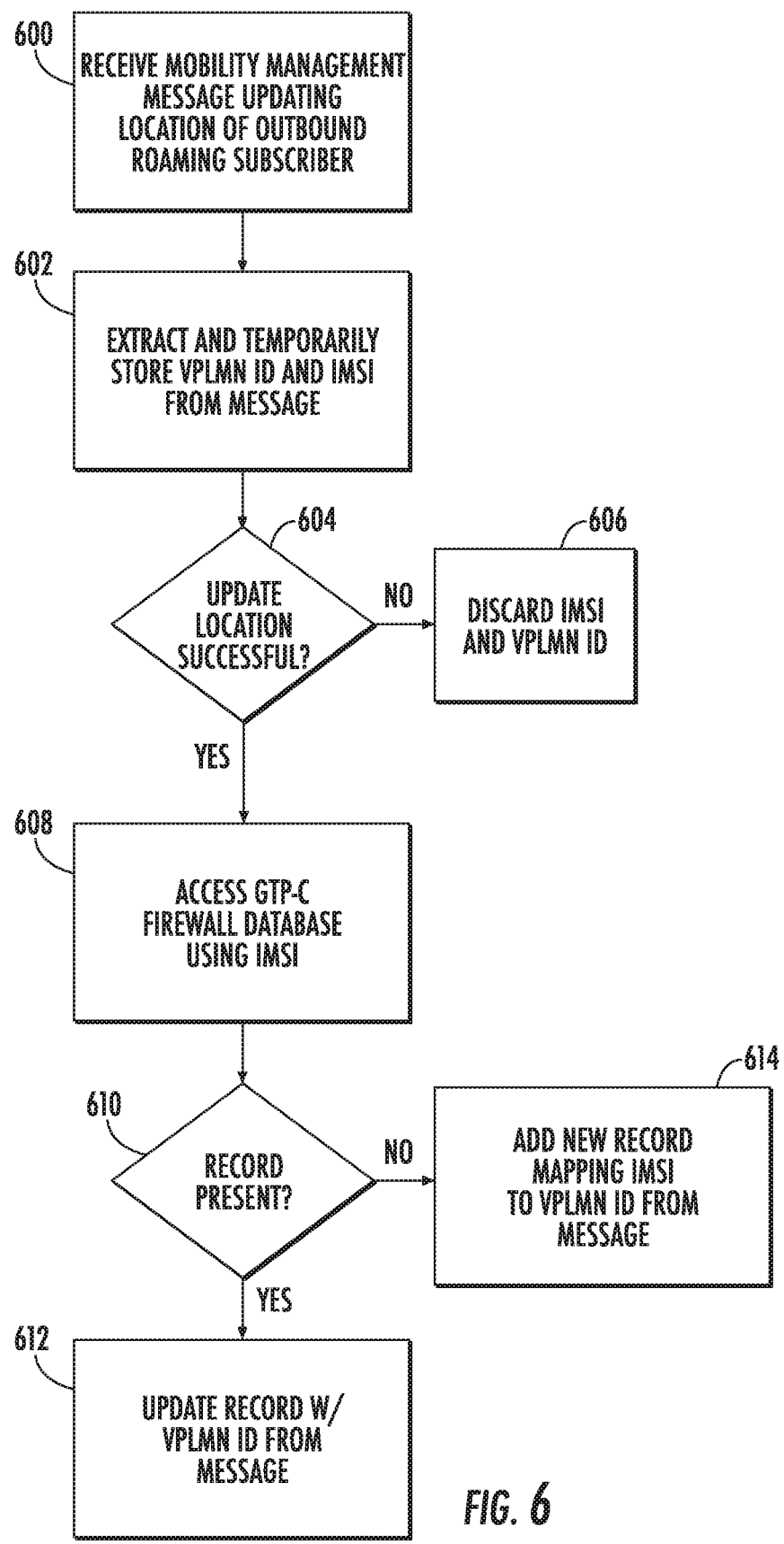
FIG. 6 is a flow chart illustrating an exemplary process for dynamically populating entry to a GTP-C screening database.

FIG. 6 is a flow chart illustrating an exemplary process for dynamically populating the indirect GTP-C firewall filtering database. Referring to FIG. 6, in step 600, a mobility management for updating of a location of an outbound roaming subscriber is received. For example, if the network uses Diameter to update the location of a subscriber, the mobility management message may be an update location request message from an MME or SGSN serving a roaming mobile subscriber for updating the subscriber's location stored in the HSS. If the network uses SS7 messaging to update the subscriber's location, the mobility management message may be a MAP update location request from a VLR for updating of the subscriber's location with an HLR.

In step 602, the process includes extracting and temporarily storing the VPLMN ID and the IMSI from the message. For example, DEA 104, DRA 106, or STP 110 may temporarily store the IMSI and the VPLMN ID of the subscriber extracted from the Diameter or SS7 update location request in memory local to DEA 104, DRA 106, or STP 110. In step 604, it is determined whether the update location was successful. For example, DEA 104, DRA 106, or STP 110 may receive an update location answer or response message from an HLR or HSS indicating successful or unsuccessful updating of a subscriber's location with the HLR or HSS. If the update location answer or request message indicates that the updating of the subscriber's location was not successful, control proceeds to step 606 where the IMSI and the VPLMN ID store in step 602 are discarded.

If, in step 604, it is determined that the update location transaction was successful, control proceeds to step 608 where the indirect GTP-C firewall filtering database is accessed using the IMSI. For example, DEA 104, DRA 106, or STP 110 may access indirect GTP-C firewall filtering database 108 using the IMSI extracted from an update location message.

In step 610, it is determined whether a record is present in the database. If a record is present in the database, control proceeds to step 612 where the record is updated with the VPLMN ID from the message. If a record is not present, control proceeds to step 614 where a new record is added mapping the IMSI to the VPLMN ID from the message.

Figure 7:
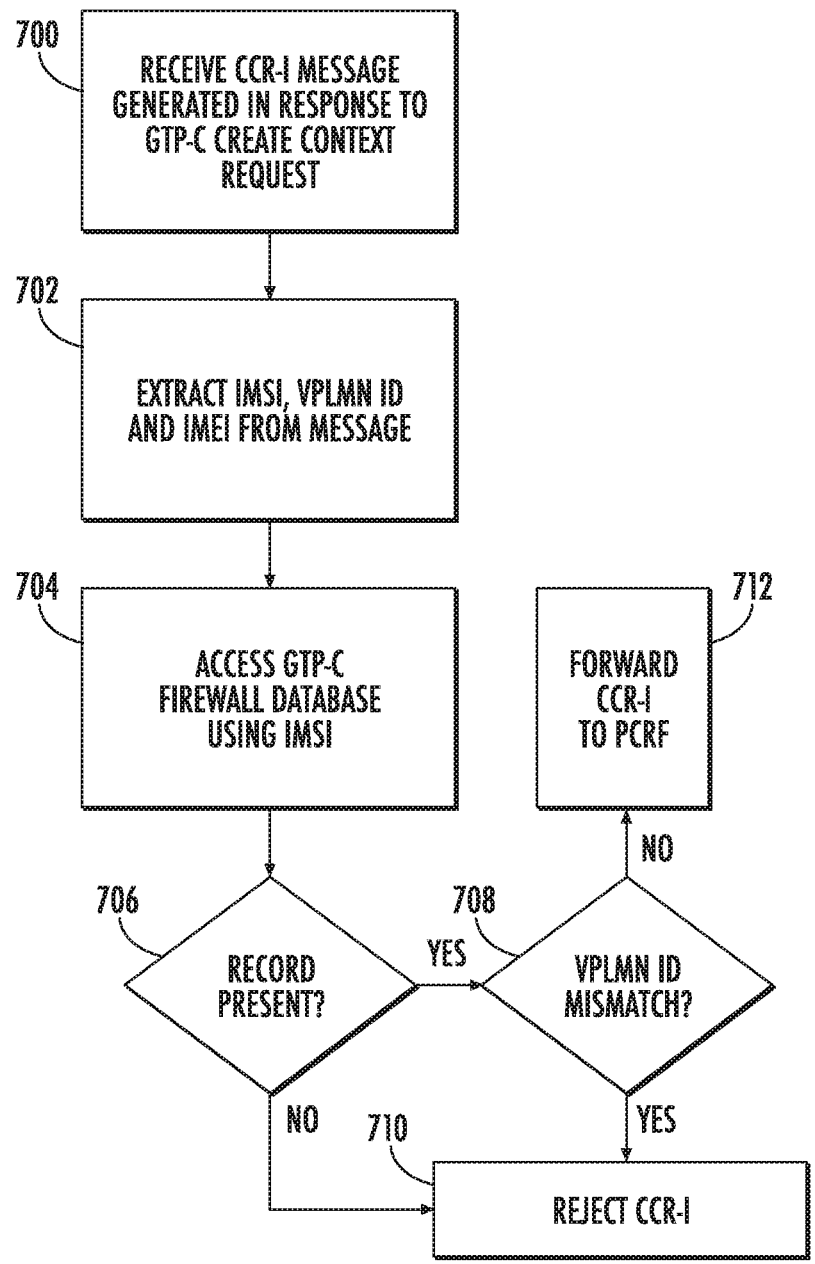
FIG. 7 is a flow chart illustrating an exemplary process for implementing GTP-C firewall functionality without intercepting GTP-C roaming signaling.

FIG. 7 illustrates an exemplary process where using a dynamically populated indirect GTP-C firewall filtering database to implement GTP-C fraud detection and screening. Referring to FIG. 7, in step 700, a CCR-I message generated in response to a GTP-C create context request message is received. For example, DEA 104 or DRA 106 may receive a CCR-I message relating to a GTP-C create context request from a legitimate subscriber or from an attacker.

In step 702, the process includes extracting the IMSI, VPLMN ID, and IMEI from the message. In step 704, the indirect GTP-C firewall filtering database is accessed using the IMSI.

In step 706, if a record is present, control proceeds to step 708 where it is determined whether the VPLMN ID from the message matches the VPLMN ID in the database record. If the VPLMN ID does not match the VPLMN ID in the database record, control proceeds to step 710 where the CCR-I message is rejected. If the VPLMN ID in the message matches the VPLMN ID stored for the IMSI in the database, control proceeds to step 712 where the CCR-I message is forwarded to the PCRF. For example, DEA 104 or DRA 106 may forward the CCR-I message to PCRF 204. PCRF 204 may determine the appropriate policy for the session and respond with a credit control request-answer (CCR-A) message indicating successful establishment of the session. DEA 104 or DRA 106 may forward the CCR-A message to the gateway GPRS support node (GGSN) that sent the CCR-I message. The GGSN may respond to the GTP-C message indicating successful creation of a PDP context.

Thus, using the process described herein, a dynamically populated indirect GTP-C firewall filtering database may be accessible by DRA, a DEA, and/or an STP and used to indirectly implement a GTP-C firewall. Such an implementation does not require that the GTP-C signaling traffic be intercepted or that the PGW implement GTP-C screening functionality. In addition, because the indirect GTP-C firewall filtering database is dynamically provisioned based on answer messages received from a subscriber's home HLR or HSS, the labor required to populate the database is reduced over manual population methods.

The disclosure of each of the following references is incorporated herein by reference in its entirety:

REFERENCES 1. 3GPP TS 29.002, "Technical Specification Group Core Network and Terminals; Mobile Application Part (MAP) specification," (Release 15) V15.5.0 (2019-06).
2. 3GPP TS 29.212, "Technical Specification Group Core Network and Terminals; Policy and Charging Control (PCC); Reference points," (Release 16) V16.1.0 (2019-09).
3. 3GPP TS 29.272, "Technical Specification Group Core Network and Terminals; Evolved Packet System (EPS); Mobility Management Entity (MME) and Serving GPRS Support Node (SGSN) related interfaces based on Diameter protocol," (Release 16) V16.0.0 (2019-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for implementing indirect general packet radio service (GPRS) tunneling protocol (GTP) firewall filtering, the method comprising:
   using a signaling message routing node to dynamically populate an indirect GTP core (GTP-C) firewall filtering database with international mobile subscriber identifiers (IMSIs) and visited public land mobile network identifiers (VPLMN IDs) extracted from mobility management signaling messages for updating locations of outbound roaming subscribers;
   receiving a credit control request-initial (CCR-I) message generated in response to a GTP-C message;
   extracting an IMSI and a VPLMN ID from the CCR-I message;
   accessing the indirect GTP-C firewall filtering database using the IMSI extracted from the CCR-I message;
   determining that a record corresponding to the IMSI is present in the indirect GTP-C firewall filtering database;
   determining that a VPLMN ID in the record does not match the VPLMN ID extracted from the CCR-I message; and in response to determining that the VPLMN ID in the record does not match the VPLMN ID extracted from the CCR-I message, rejecting the CCR-I message.

2. The method of claim 1 wherein using a signaling message routing node to dynamically populate the indirect GTP-C firewall filtering database includes, at the signaling message routing node:
receiving a Diameter update location request (ULR) message for updating a location of a subscriber with a home network of the subscriber;
extracting an IMSI and VPLMN ID from the Diameter ULR message;
temporarily storing the IMSI and the VPLMN ID extracted from the Diameter ULR message;
determining that the updating of the location of the subscriber with the home network of the subscriber is successful; and
in response to determining that the updating of the subscriber's location is successful, associating the VPLMN ID extracted from the Diameter ULR message with the IMSI extracted from the Diameter ULR message in the indirect GTP-C firewall filtering database.

3. The method of claim 2 wherein the signaling message routing node comprises a Diameter edge agent.

4. The method of claim 2 wherein the signaling message routing node comprises a Diameter relay agent (DRA).

5. The method of claim 1 wherein dynamically populating the indirect GTP-C firewall filtering database includes, at the signaling message routing node:
receiving a mobile application part (MAP) update location request message for updating a location of a subscriber with a home network of the subscriber;
extracting an IMSI and VPLMN ID from the MAP update location request message;
temporarily storing the IMSI and the VPLMN ID extracted from the MAP update location request message;
determining that the updating of the location of the subscriber with the home network of the subscriber is successful; and
in response to determining that the updating of the location of the subscriber with the home network of the subscriber is successful, associating the VPLMN ID with the IMSI extracted from the MAP update location request message in the indirect GTP-C firewall filtering database.

6. The method of claim 5 wherein the signaling message routing node comprises a signal transfer point (STP).

7. The method of claim 6 wherein the indirect GTP-C firewall filtering database resides on a computing platform separate from the signaling message routing node.

8. The method of claim 1 wherein the indirect GTP-C firewall filtering database is co-located with the signaling message routing node.

9. The method of claim 1 wherein the Indirect GTP-C firewall filtering database is located on a computing platform separate from the signaling message routing node and from a home location register (HLR) or home subscriber server (HSS).

10. The method of claim 1 further comprising:
dynamically populating the GTP-C firewall filtering database with international mobile equipment identifiers (IMEIs) extracted from mobility management signaling messages;
extracting an IMEI value from the CCR-I message; and
using the IMEIs in the GTP-C firewall filtering database to screen the CCR-I message.

11. A system for implementing indirect general packet radio service (GPRS) tunneling protocol (GTP) firewall filtering, the system comprising:
at least one memory;
an indirect GTP core (GTP-C) firewall filtering database; and
at least one signaling message routing node configured to dynamically populate the indirect GTP-C firewall filtering database with international mobile subscriber identifiers (IMSIs) and visited public land mobile network identifiers (VPLMN IDs) extracted from mobility management signaling messages for updating locations of outbound roaming subscribers, receive a credit control request-initial (CCR-I) message generated in response to a GTP-C message, extract an IMSI and a VPLMN ID from the CCR-I message, access the indirect GTP-C firewall filtering database using the IMSI extracted from the CCR-I message, determine that a record corresponding to the IMSI is present in the indirect GTP-C firewall filtering database, determine that a VPLMN ID in the record does not match the VPLMN ID extracted from the CCR-I message, and, in response to determining that the VPLMN ID in the record does not match the VPLMN ID extracted from the CCR-I message, reject the CCR-I message.

12. The system of claim 11 wherein the at least one signaling message routing node is configured to dynamically populate the indirect GTP-C firewall filtering database by:
receiving a Diameter update location request (ULR) message;
extracting an IMSI and VPLMN ID from the Diameter ULR message;
temporarily storing the IMSI and the VPLMN ID extracted from the Diameter ULR message;
determining that the updating of the subscriber's location is successful; and
in response to determining that the updating of the subscriber's location is successful, associating the VPLMN ID extracted from the Diameter ULR message with the IMSI extracted from the Diameter ULR message in the indirect GTP-C firewall filtering database.

13. The system of claim 12 wherein the at least one signaling message routing node comprises a Diameter edge agent.

14. The system of claim 12 wherein the at least one signaling message routing node comprises a Diameter relay agent (DRA).

15. The system of claim 11 wherein the at least one signaling message routing node is configured to dynamically populate the indirect GTP-C firewall filtering database by:
receiving a mobile application part (MAP) update location request message;
extracting an IMSI and VPLMN ID from the MAP update location request message;
temporarily storing the IMSI and the VPLMN ID extracted from the MAP update location request message;
determining that the updating of the subscriber's location is successful; and
in response to determining that the updating of the subscriber's location is successful, associating the VPLMN ID with the IMSI extracted from the MAP update location request message in the indirect GTP-C firewall filtering database.

16. The system of claim 15 wherein the at least one signaling message routing node comprises a signal transfer point (STP) for dynamically populating the GTP-C firewall filtering database and a Diameter agent for receiving the CCR-I message generated in response to the GTP-C message, extracting the IMSI and the VPLMN ID from the CCR-I message, accessing the indirect GTP-C firewall filtering database using the IMSI extracted from the CCR-I message, determining that a record corresponding to the IMSI is present in the indirect GTP-C firewall filtering database, determining that the VPLMN ID in the record does not match the VPLMN ID extracted from the CCR-I message, and, in response to determining that the VPLMN ID in the record does not match the VPLMN ID extracted from the CCR-I message, rejecting the CCR-I message.

17. The system of claim 11 wherein the indirect GTP-C firewall filtering database is co-located with the at least one signaling message routing node.

18. The system of claim 11 wherein the indirect GTP-C firewall filtering database is located on a computing platform separate from the at least one signaling message routing node and from a home location register (HLR) or home subscriber server (HSS).

19. The system of claim 11 wherein the at least one signaling message routing node is configured to:
dynamically populate the indirect GTP-C firewall filtering database with international mobile equipment identifiers (IMEIs) extracted from mobility management signaling messages;
extract an IMEI value from the CCR-I message; and
use the IMEIs in the GTP-C firewall filtering database to screen the CCR-I message.

20. A non-transitory computer readable medium having stored thereon executable instructions that when executed by a processor of a computer control the computer to perform steps comprising:
using a signaling message routing node to dynamically populate an indirect general packet radio service (GPRS) tunneling protocol core (GTP-C) firewall filtering database with international mobile subscriber identifiers (IMSIs) and visited public land mobile network identifiers (VPLMN IDs) extracted from mobility management signaling messages for updating locations of outbound roaming subscribers;
receiving a credit control request-initial (CCR-I) message generated in response to a GTP-C message;
extracting an IMSI and a VPLMN ID from the CCR-I message;
accessing the indirect GTP-C firewall filtering database using the IMSI extracted from the CCR-I message;
determining that a record corresponding to the IMSI is present in the indirect GTP-C firewall filtering database;
determining that a VPLMN ID in the record does not match the VPLMN ID extracted from the CCR-I message; and
in response to determining that the VPLMN ID in the record does not match the VPLMN ID extracted from the CCR-I message, rejecting the CCR-I message.

* * * * *